United States Patent [19]

Weinberger et al.

[11] Patent Number: 5,644,682

[45] Date of Patent: Jul. 1, 1997

[54] METHOD AND SYSTEM FOR INCORPORATING INDICIA INTO A DOCUMENT GENERATED BY A COMPUTER APPLICATION

[75] Inventors: Joseph Weinberger, 13 Guernsey La., East Brunswick, N.J. 08816; Gary Bricault, Rochester, N.Y.

[73] Assignee: Joseph Weinberger, East Brunswick, N.J.

[21] Appl. No.: 360,938

[22] Filed: Dec. 21, 1994

[51] Int. Cl.⁶ .................................................. G06F 3/00
[52] U.S. Cl. ........................... 395/101; 395/117; 395/821
[58] Field of Search .......................... 395/821, 100–113, 395/117; 355/218; 400/63

[56] References Cited

U.S. PATENT DOCUMENTS

| | | | |
|---|---|---|---|
| 4,352,554 | 10/1982 | Kaye et al. | 355/40 |
| 4,445,795 | 5/1984 | Levine et al. | 400/63 |
| 4,454,576 | 6/1984 | McInroy et al. | 400/63 |
| 4,712,907 | 12/1987 | Weinberger et al. | 355/7 |
| 4,806,976 | 2/1989 | Kato et al. | 355/7 |
| 4,845,525 | 7/1989 | Ito | 355/218 |
| 4,858,171 | 8/1989 | Furusawa et al. | 400/63 |
| 4,903,232 | 2/1990 | OConnell et al. | 395/101 |
| 4,944,614 | 7/1990 | Tanaka | 400/68 |
| 5,021,832 | 6/1991 | Fukushima | 355/218 |
| 5,025,398 | 6/1991 | Nelson | 364/519 |
| 5,169,083 | 12/1992 | Sannohe et al. | 242/67.1 R |
| 5,183,250 | 2/1993 | Miller et al. | 271/222 |
| 5,238,345 | 8/1993 | D'Andrea | 412/4 |
| 5,436,974 | 7/1995 | Kovanen | 380/51 |
| 5,480,239 | 1/1996 | Kim et al. | 400/120.09 |
| 5,535,009 | 7/1996 | Hansen | 358/296 |

OTHER PUBLICATIONS

Novell, Inc., "WordPerfect V 6.1", 1994, pp. 642–648.
Working Software, Inc., "Working Watermarker for the Microsoft® Windows™ Operating System", 1994.
Advertisement for Working Software, Inc., "Water Watermarker for Windows".

Primary Examiner—Ayaz R. Sheikh
Attorney, Agent, or Firm—Hedman, Gibson & Costigan, P.C.

[57] ABSTRACT

A method and system for incorporating additional indicia into a document generated by an off-the-shelf computer application without altering the source document or the application. A source document created by an application is sent to a printer driver for creation of a document image from the source document and delivery of the document image to a printer. Execution of the printer driver is interrupted, preferably after each individual page has been sent to the printer driver, and program flow is redirected to a sub-application. The sub-application is a program that monitors the stream of commands to the printer driver and takes actions based on a selected set of those commands to modify the image that is being prepared for printing. The exact nature of the modification would be dependent on the desired result for the sub-application but most likely it would be an operation that would render indicia onto the document image in addition to any that the application had already placed there. Program flow is then redirected back to said printer driver.

14 Claims, 9 Drawing Sheets

17 — GET PRINTER CAPABILITIES AND DEVICE INFORMATION

18 — START DOCUMENT

19 — START PAGE

20 — BUILD IMAGE IN DEVICE CONTEXT

21 — NEXT BAND

22 — END OF DOCUMENT — N (loops back), Y ↓

23 — END DOCUMENT (PRIOR ART)

*FIG. 4*

OTHER GDI FUNCTIONS (LINE 1)
int FAR PASCAL Control (LPDV lpdv, short function,
　　　　　　　　　　　　　　　LPSTR lpInData, LPSTR lpOutData)
　{
(LINE 2)
EdgePrintControlEntry (lpdv, function, lpInData, lpOutData);

(LINE 3)
return(GIControl (lpdv, function, lpInData, lpOutData));
　}

OTHER GDI FUNCTIONS

*FIG. 5*

METHOD AND SYSTEM FOR INCORPORATING INDICIA INTO A DOCUMENT GENERATED BY A COMPUTER APPLICATION

FIELD OF THE INVENTION

This invention relates to a means of adding indicia onto a surface document as it is being printed by an off-the-shelf computer application. More specifically, the present invention relates to a means and method for adding indicia to a document independent of the application program used to create the document.

BACKGROUND OF INVENTION

Standard computer application programs are used to create, edit and store source documents. At some time a user may convert the stored image to a printed document through the use of a printing device. As a document is printed, well known computer software applications, such as word processors or spreadsheets, not only output the body of the document but may also include special markings such as date, time and page numbering, usually located in a header or footer area.

In special situations it may be necessary to provide additional markings to a document to further identify it. Examples include marking a document "CONFIDENTIAL" or "COPY" or sequentially numbering a series of documents. Currently this operation could be accomplished manually, either by handwritten or stamped addition to the document, or by a semiautomatic device that can annotate indicia to a document as it is being photocopied such as described in U.S. Pat. No. 4,712,907, issued to Weinberger et al.

Another application for adding special indicia is found in edge printing a document. In this application, indicia are applied to the edge of each page of a document, such that when viewed from the side of the completed, collated document the ordered pages combine to produce readable text. Traditionally, this has been accomplished by manually stamping the edge of the documents after collation but may also be implemented by a semiautomatic device capable of adding the additional indicia during the photocopying process as disclosed in U.S. Pat. No. 4,352,554, issued to Kaye et al. In each of these cases, indicia are added as a post-creation step of the original printed document.

Presently there does not exist any off-the-shelf computer applications that allow the user to supplement the original document image with special indicia prior to printing on a page-by-page basis. Accordingly, if special indicia are desired on the original document, resort must be made to manually adding such marks after the original document is printed, or photocopying the original printed document with the special indicia being added to the duplicate document only. Although one solution to this problem is to create a set of custom applications, such as word processors, spreadsheets, etc., this approach would obviously involve extensive programming and would not result in a cost effective solution.

SUMMARY OF THE INVENTION

It is therefore an object of the present invention to provide a method of incorporating special indicia into a document which has been created using an off-the-shelf computer application.

It is another object of the present invention to incorporate the added indicia into the printed document without altering the source document created by the application and without modifying the application.

In accordance with these and other objectives, a process is disclosed for use in a computer system having an application for creating a source document and a printer driver for creating a document image from the source document and delivering the document image to a printer device.

The approach taken by the present invention is to develop a sub-application capable of modifying the document image as it is being prepared for printing by the printer driver, independent of the specific application used to create it. The added indicia are created and incorporated into the document from an external source, not as a secondary, post printing operation, but as the application is actually creating the image of the source document within the printer driver just prior to its delivery to the printer and without in any way altering the source document.

Execution of the printer driver is interrupted and program flow is redirected to a sub-application. The sub-application determines the status of the document image creation process and the desired indicia are incorporated into the document image prior to being sent to the printer. Program flow is then returned to the printer driver and the modified document image is sent to the printer.

BRIEF DESCRIPTION OF THE DRAWINGS

The present invention can be better understood when considered with the following drawings wherein:

FIG. 4 is a Flow Chart illustrating a simplified, typical printing operation as it would occur using a Windows based application;

FIG. 5 is a Program Listing of the modification that is made to the mini-driver Control function contained in the source module minidriv.c;

DETAILED DESCRIPTION OF THE PREFERRED EMBODIMENT

Computer applications, such as word processors and spreadsheets, allow a user to create, edit and store source documents in an essentially output device-independent form. However, output devices, such as printers, have a wide variety of device specific requirements and unique commands that allow them to produce an image on paper. Some of these printer specific requirements include, print resolution, head and paper positioning commands, internal font support, etc. In order to provide a means for a device-independent computer application to output a document to a device specific printer, a special software interface called a printer driver, is provided (often by the printer manufacturer).

Figure 1:
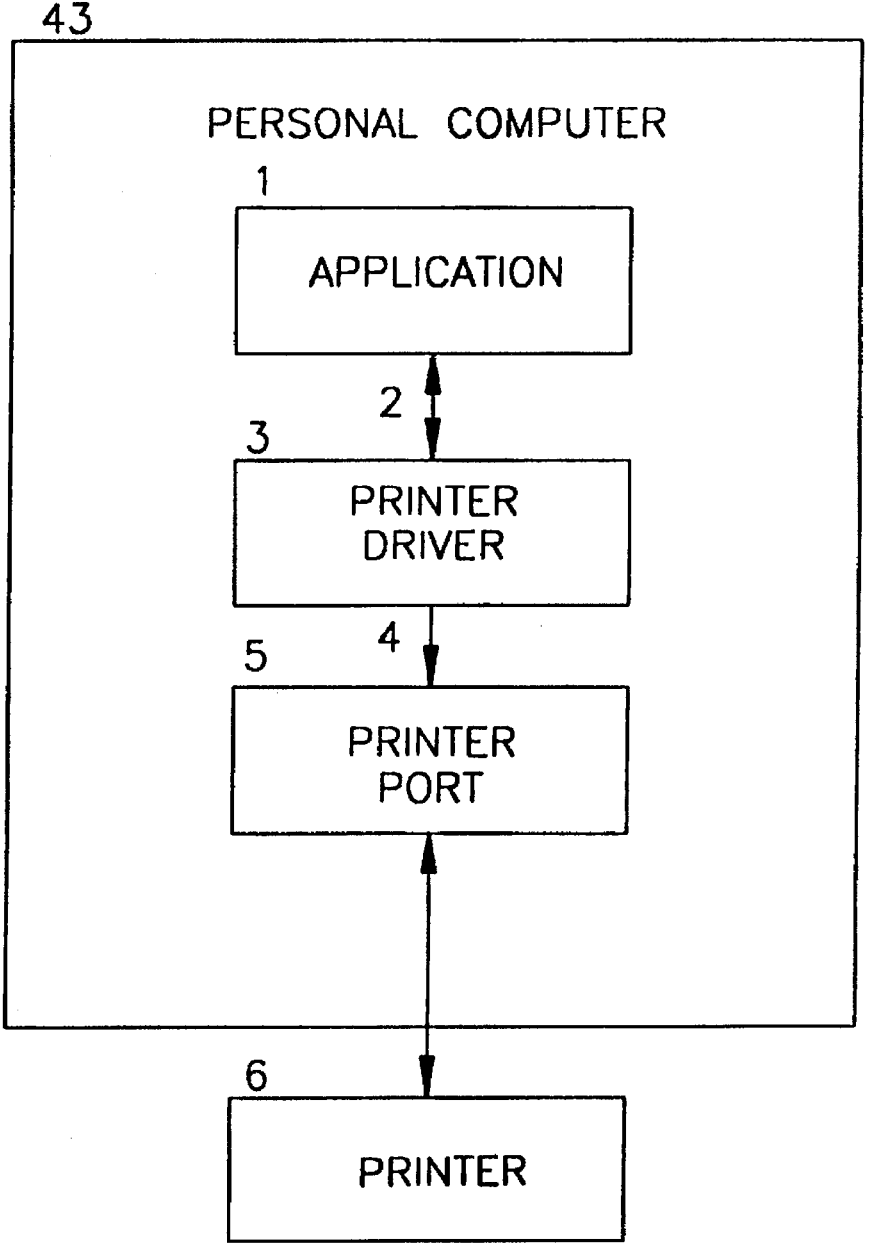
FIG. 1 is a Block Diagram of a prior art computer system utilizing a Printer Driver to interface an application to a printer.

As shown in FIG. 1, the printer driver 3 resides in the data flow path between the application software 1 and the printer port electronics 5 that interfaces the personal computer 43 to a physical printer 6. The printer driver 3 accepts as input standard high level commands 2 from the application software 1 such as;

start document start page print a line of text at (x1,, y1)

print a line of text at (x2, y2)

end page end document

The printer driver 3 converts the high level commands 2 into a series of printer specific commands 4 that the printer 6 receives, via the printer port 5. The printer 6 translates the printer specific commands 4 into carriage motion, internal initialization and printing operations.

In addition, the printer driver 3 is usually programmed to provide printer capability information to the computer application 1 as well as status information of the printer 6. The printer driver 3 also may be able to perform special types of transformations such a image scaling or rotation. In all of these cases, the printer driver 3 is a slaved interface between the device-independent computer application 1 and the printer specific printer 6 for the purpose of producing an accurate copy of the source document.

In simple operating systems, such as DOS, printer drivers are generally supplied by the application software vendor. That is, each application, such was a word processor, usually has its own set of printer drivers, one for each set of supported printers available at the time that the application is being sold. Each set of printer drivers are able to accept only the input commands from a specific application and no other. A set of installation diskettes would typically contain numerous printer driver files, in addition to the actual application.

With the advent of more sophisticated operating systems, such as Windows, a general purpose philosophy of drivers was introduced. A set of application-independent printer drivers were supplied with the operating system that included one or more printers or family of printers. That is, a common interface standard was developed through which all applications could send high level commands to a specified printer driver that would in turn render output on the printer. In Windows, this interface is known as the Graphic Device Interface (GDI) and consists of a set of 24 functions that an application may use.

Prior to Windows 3.1, printer drivers were designed and hard coded to support the GDI interface standard in programming languages such as 'C'. Producing a printer driver meant not only becoming an expert in all of the nuances of a printer's operation, it also meant writing a very large amount of software to interface the GDI calls to respond to an application request for status or produce some printer action.

Figure 2:
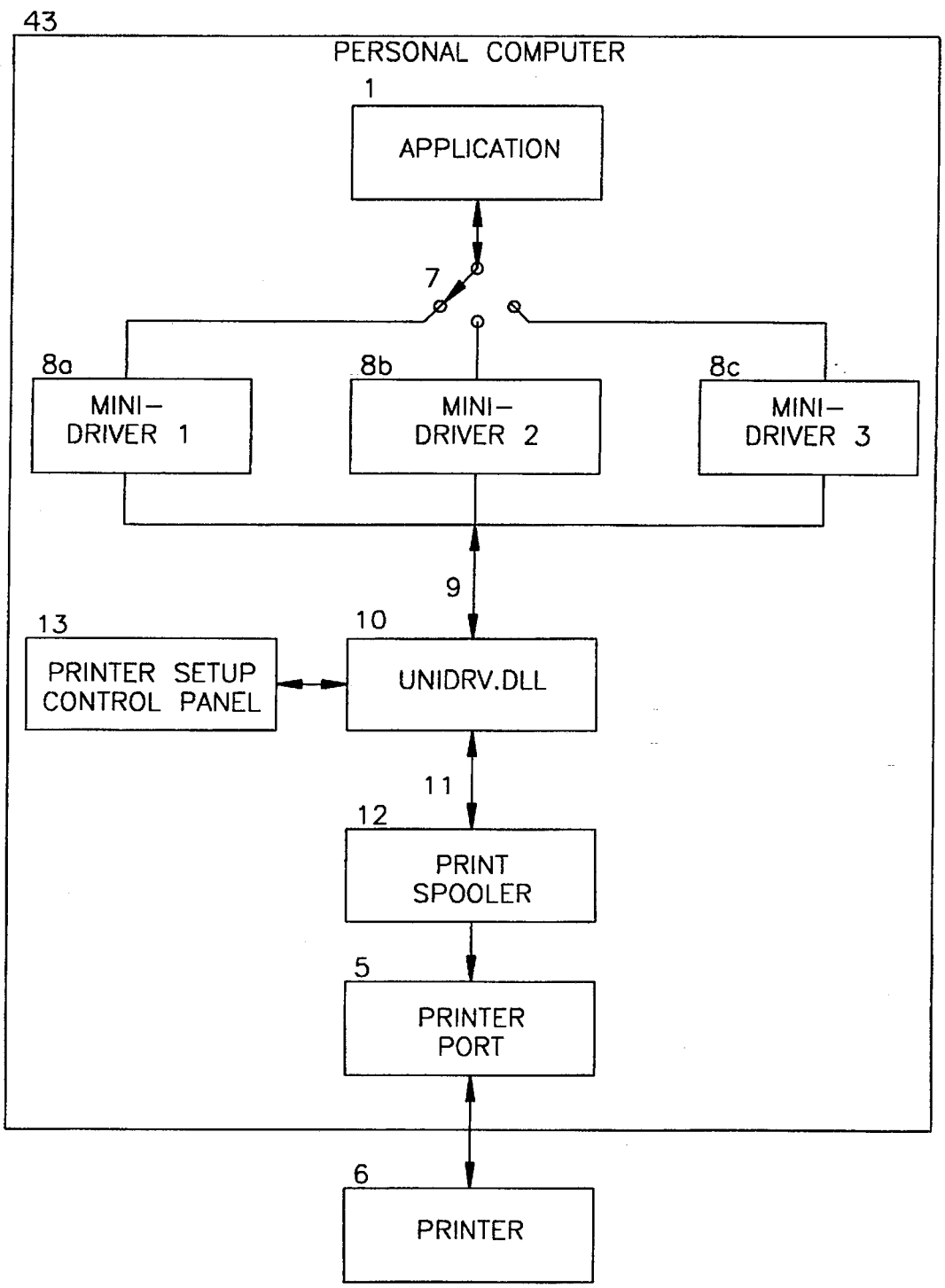
FIG. 2 is a Block Diagram of a prior art Windows 3.1 system utilizing a Printer Mini-Driver and UNIDRV.DLL to interface an application to a printer.

The entry of Windows 3.1 changed the way that printer drivers were implemented. As shown in FIG. 2, Universal Printer Driver Dynamic Link Library (UNIDRV.DLL) 10 is provided as part of the Windows 3.1 operating system along with user selectable, printer specific mini-drivers 8a–8c. The mini-driver provides the entry interface for the application GDI function calls 7 and includes a set of tables containing printer specific information. It in turn passes the GDI calls on to entry points 9 into UNIDRV.DLL 10, where they are processed into printer specific commands and image patterns 11 for storage within a print spooler 12 or returned to the application 1 in the form of printer information or status 7.

When the print generation operation is completed, the UNIDRV.DLL 10 signals the print spooler 12 to place the job into the printing queue. When the job reaches the top of the print request queue it outputs the contents to the printer 6 through printer port 5, from which the printer renders an image of the original source document onto paper.

The UNIDRV.DLL 10 may be configured through a printer setup control panel 13 for special document requirements such as image orientation, paper size, paper source, etc. FIG. 2 shows multiple mini-drivers 8a–c contained within the personal computer environment 43. This concept allows multiple printer drivers to be installed on a single machine at any given time to support one or more printers that might be attached to the computer, e.g. over a network or multiplexed through a switch box. When a user desires to use a certain printer, the appropriate printer driver must be selected prior to printing the document.

The concept of a "mini-driver" is well understood by developers of Windows printer drivers and can be produced using a special development tool known as UNITOOL. This tool is available from Microsoft Corp. and is included in the Driver Development Kit (DDK) available through a level 2 Subscription to the Microsoft Developer Network.

A mini-driver consists of two basic components; a source file called "minidriv.c" and a printer specific resource file. Minidriv.c contains the GDI function interface that receives GDI calls from an application and in turn passes the calls directly to UNIDRV.DLL. The resource file is created using UNITOOL and consists of data structures containing printer specific information such as resolution, metrics of device fonts, command string tables, and so on. When these files are compiled and linked together with other support libraries installed in the computer, the result is a printer driver that is capable of interfacing any Windows compatible application to a specific printer(s).

In accordance with the present invention, externally produced indicia are rendered into a source document with the added possibility that the indicia be different on every page. As previously stated, existing applications do not allow additional indicia to be automatically collated into the document at print time. The approach taken by the present invention is to create a means for modifying the print image prior to its transmission to the printer which is independent of the off-the-shelf application used to create the original image. Such a program has application in various contexts, inter alia, edge printing, overstrike or page annotation.

Figure 3:
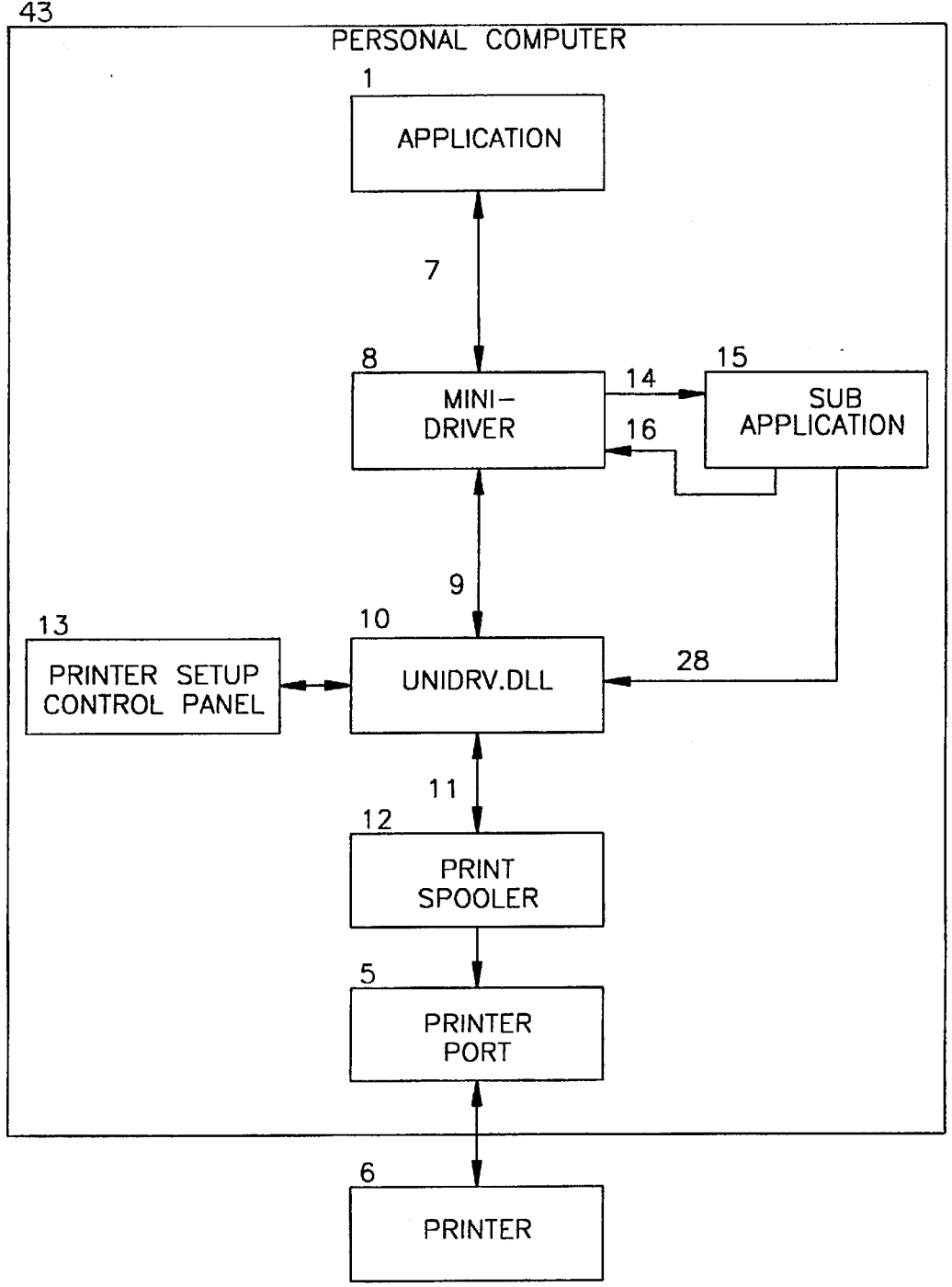
FIG. 3 is a Block Diagram of the present invention.

As shown in FIG. 3, the present invention uses an existing mini-driver 8 that has been modified so that it passes GDI information 14 to an external sub-application 15. The sub-application 15 is a program (more specifically a program contained within a dynamic link library) that monitors the stream of GDI commands and takes actions based on a selected set of GDI commands to modify the image that is being prepared for printing 28 by the UNIDRV.DLL 10. Control is then returned 16 to the printer mini-driver 8.

Using this approach, a sub-application 15 is created and used with a properly modified mini-driver 8 to meet a variety of needs, such as edge printing, without requiring specialized knowledge of the application 1.

Of the 24 GDI commands, only the Control function handler of mini-driver 8 is modified to provide an interface into the new sub-application 15. The GDI Control function performs various device-independent operations such as starting a print job, starting and ending a page, canceling a print job, etc. This forms a time bracket within which falls the image creation process.

In the Windows environment image creation and transformation operations are well known to be performed within what is known as a device context. A device context refers to a physical output device (such as a video display or printer) and its device driver. In the context of a video or printer driver they might be best thought of as a region of memory that has the same physical dimensions (characteristics) as the actual output device. For example, a SVGA video device could be described as 600 pixels high by 800 pixels wide which would translate to screen coordinates. By writing data to the appropriate memory location, the image to be displayed is modified.

In order to access a physical device, it is necessary to obtain a handle (like opening a link) to the device context. Once this occurs, the owner of the handle inherits all of the physical capabilities of the device and can write data (such as text or an image) to it. In the case of a video display, text would be placed at the coordinate specified by the application and automatically rasterized into pixels that are scaled by the device driver according to the known capabilities of the device. Bitmap images are likewise treated in the same manner, where bit to pixels may be mapped 1 to 1 or scaled or rotated according the capabilities of the device. In the case of a printer, the image is created within the device context on a page-by-page basis and sent to the print spooler for transmission to the physical device upon completion of the print generation operation.

FIG. 4 illustrates a simplified, typical printing operation as it would occur using a Windows based application. The application first makes queries to obtain the output device capabilities through a series of GDI calls 17, either when the application is first opened or just prior to the start of the printing operation. When the application is ready to begin to create the actual image it issues a GDI Control command, Start Document 18. Then a Start Page 19 GDI Control command is issued to indicate to the printer driver that any imaging commands will modify the device context for the current page. The application then writes the image into the device context 20 through a series of GDI image commands made by the application such as TextOut and BitBlt.

When the current page is fully imaged, the application issues a GDI Control command Next Band 21 to indicate that operations on that page have concluded and it is ready to be passed on to the print spooler. If there are additional pages the process is repeated 22. When the document creation process is concluded the GDI Control command End Document 23 is issued indicating that the print spooler has received its total input and can now place a print request into the queue of the Windows print manager.

FIG. 5 illustrates the modification that is made to the mini-driver Control function contained in the source module minidriv.c when using the present invention. In a Windows application program, the GDI Control function is actually called as a result of the application 1 (as shown in FIG. 3) issuing one of a series of API Escape function commands, such as Start Document. This is converted to one of the appropriate GDI Control function commands 7 that are ultimately passed along 9 to UNIDRV.DLL 10.

Line 1 of FIG. 5 is the GDI entry point for Control function call. In the unmodified minidriv.c module, the arguments to the function are passed directly to what is now indicated as line 3, GlControl. This is the direct entry point 9 into UNIDRV.DLL 10 for Control function calls. The inclusion of line 2, EdgePrintControlEntry, temporarily redirects program execution 14 into the sub-application 15, in this case, for edge printing. Here the Control command is evaluated, possibly to initiate some additional software actions within the sub-application, prior to returning control 16 to the mini-driver module 8.

Figure 6:
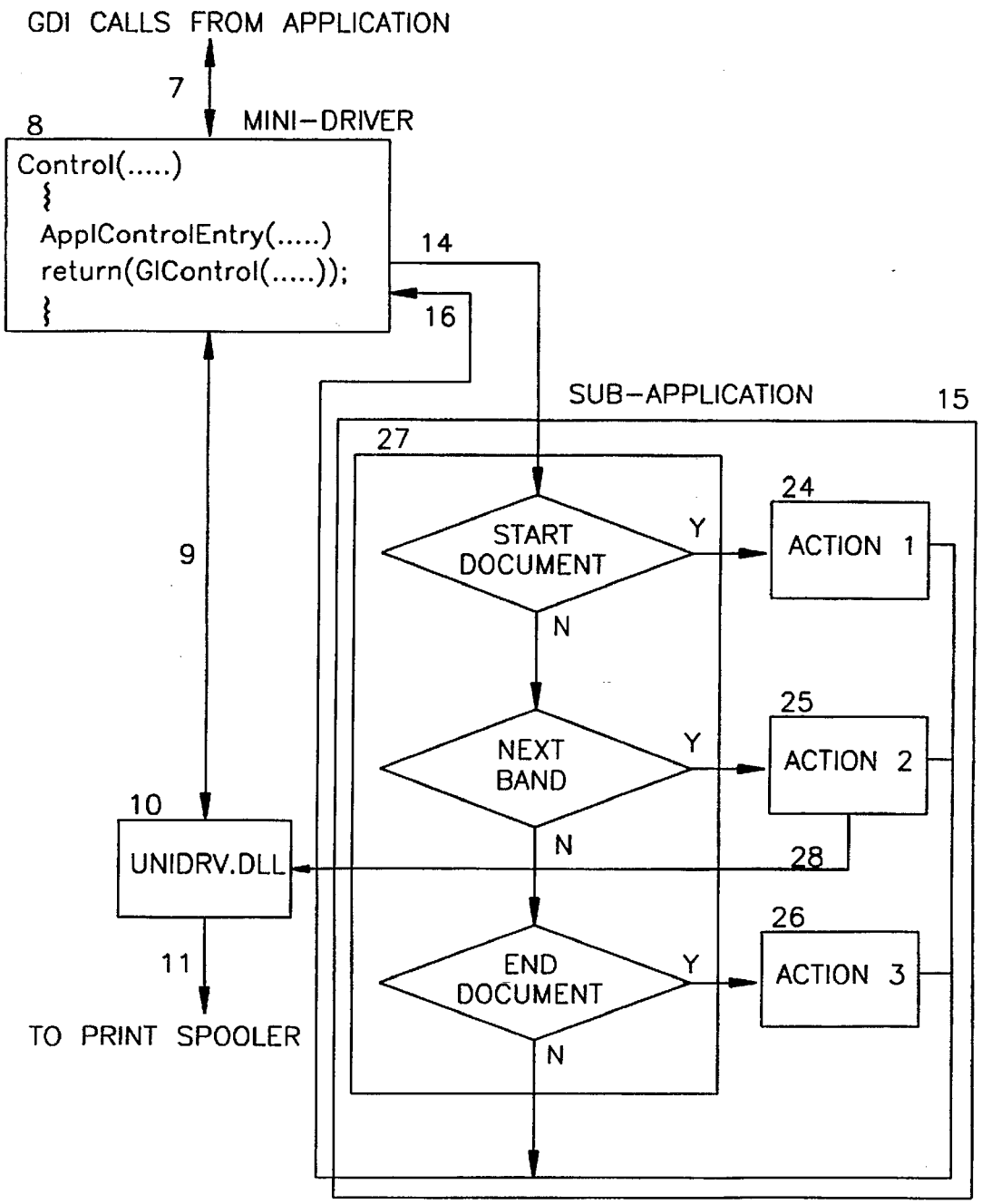
FIG. 6 is a Flow Chart of the operation of present invention.
Figures 7A, 7B:
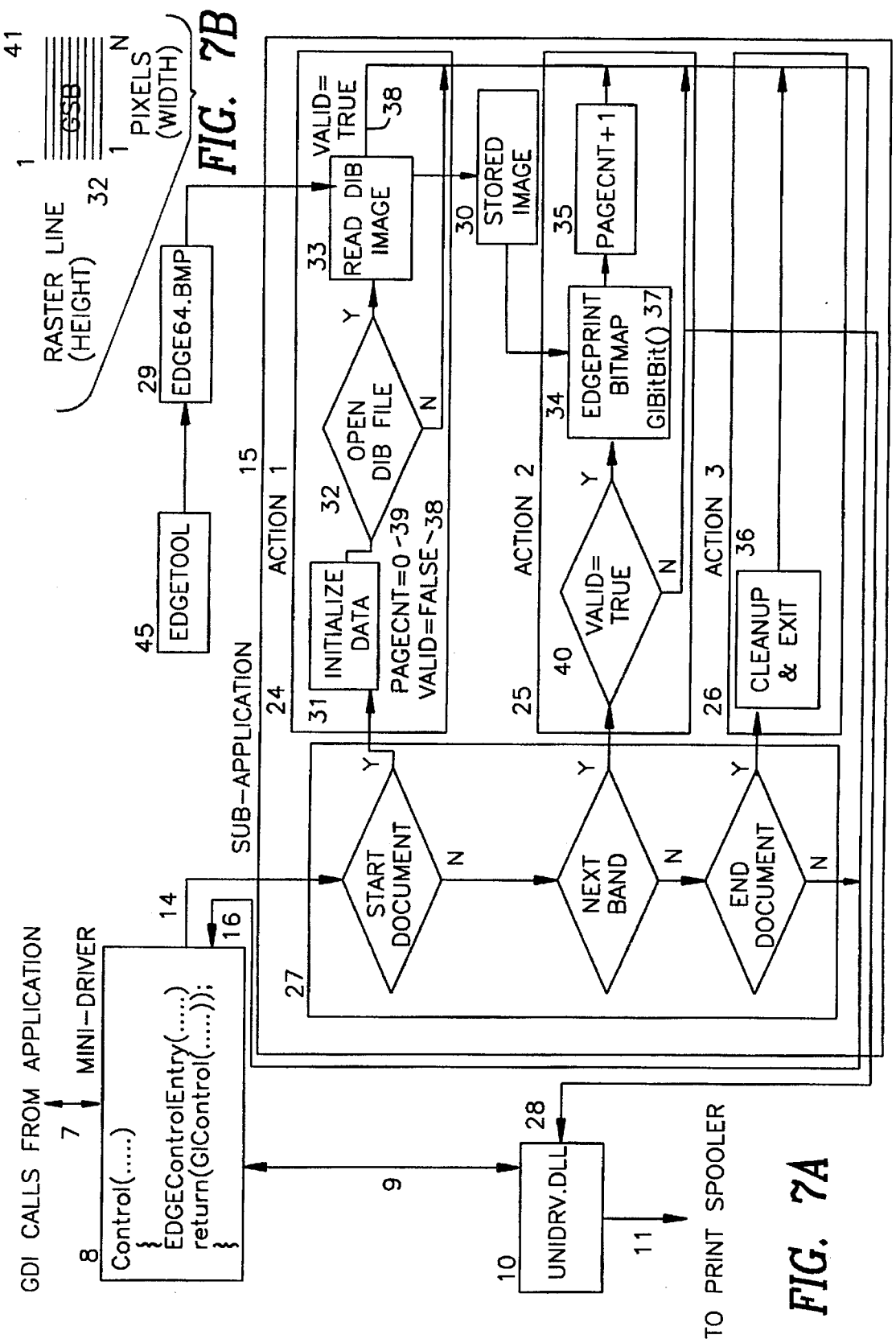
FIG. 7A is a Flow Chart of the operation of the Edge Printing specific embodiment of present invention.
FIG. 7B is a bit map image in rasterized form of the text to be printed.

This process is shown in finer detail in FIG. 6. The modified mini-driver 8 shows the software code fragment comprising the GDI Control function entry point. Upon receiving the Control function call 7, the sub-application entry point ApplControlEntry (a generic application name) redirects the programmed execution flow 14 into the sub-application 15. Once there, a decoding algorithm 27 causes program execution flow to be redirected to Action functions 1, 2 or 3 (24, 25 or 26 respectively) if the Control function I.D. matches one of the decoder tests. Otherwise execution flow is returned 16 to the mini-driver 8 without any action having been taken.

If the decoder algorithm 27 matches a Start Document command, execution passes through Action 1 24 where some operation integral to the sub-application is performed. In like manner, if the decoder matches a Next Band command, Action 2 25 is performed or if the decoder matches an End Document command, execution is transferred to Action 3 26.

Although the Next Band command is used to trigger execution of Action 2 25 in the flow chart of FIG. 6, any of the Control function commands may be used. For example, the Start Page Control function command may be used thereby causing Action 2 25 to be performed before each page of the source document is rendered into the device context as opposed to after.

Contained within Action 2 is a function call directly to an entry point 28 into UNIDRV.DLL 10. The exact nature of the call is dependent on the desired result for the sub-application but generally is an operation that renders indicia into the context of the output device in addition to any that the application had already placed there.

Upon completion of any of the Actions 1–3 24–26, program execution flow is returned to the mini-driver 8 through 16.

EXAMPLE

An example of an actual sub-application for Edge Printing is demonstrated in FIGS. 7A–7B and 8A–8C. The preferred embodiment of this example is a Gateway 2000 4DX2-66L personal computer running DOS 6.22 and Windows 3.1 and an Epson compatible 24-pin dot matrix printer. Software was developed using Borland's Turbo C/C++ 4.0 and mini-driver development tools supplied in the Microsoft Developer Network Level 2 kit, October 1994.

Prior to the printing operation a 32 page source document was created (but not printed) using Word 2.0, a Windows compatible word processor. The source document will serve as the media to be edge printed with a text string along the bound edge.

In order to produce a text image that is pre-rasterized and scaled according to the requirements of a target document, a special user input program called Edgetool 45, was developed. The Edgetool program 45 acts as an input from the user for entry of the text to be edge printed and the page count of the target document. The text information is saved into a Device Independent Bitmap (DIB) file 29, named here as EDGE64.BMP (BMP is a file extension for Bit Mapped Pixel file) in rasterized form 41, pre-scaled and rasterized (in this example into 32 raster lines of pixels, R1–R32). The raster lines of pixels correspond to one raster line of image for every page of the source document. The BMP file format contains a header section that contains parametric information about the contents and organization of the file and is well understood by Windows software developers.

When the 32 page source document is committed to be printed, the application initializes itself to the printing context, generates initialization information for the printer and then begins the process of sending the document to the mini-driver 8 for the creation of an image in the output device context. Before the document can be formed into the device context, the application issues a GDI Control function call 7 with Start Document as the specific command type. This GDI call is received by the printer mini-driver 8 and redirected through the entry point 14 to the sub-application 15 that was placed in the Control function of the printer mini-driver 8. The GDI function call is then decoded 27. The match of the command type to Start Document causes program execution to be routed through the path labeled Action 1 24.

The execution path first initializes the global data structures 31, and in particular the variables PageCnt 39 and Valid 38 are initialized to PageCnt=0 and Valid=FALSE. PageCnt 39 will count the document pages and will cause the correct raster line of image to be printed on the respective page of the printed document. Valid 38 will be set to TRUE if an image file is properly loaded prior to the printing operation. At this point 32 the user will be prompted through a dialog box to open the BMP file 29 that was created earlier for the document (EDGE64.BMP in this example). If the user cancels the dialog box the printing operation will proceed with no indicia being incorporated into the source document as it is being printed.

If the user does select the BMP file, the bit map image 41 will be read and oriented 33 according to the desired printing orientation as it is loaded into memory as a stored image 30. The flag Valid 38 will be set to TRUE to indicate that a valid image exists for the sub-application. The parametric header contents of the BMP file 29 are saved for later use. At the conclusion of Action 1 control is returned to the printer mini-driver 8 through 16.

When the application has completed writing the image for the first page into the device context the application issues a GDI Control function call 7 with Next Band as the specific command type. This GDI call is received by the printer mini-driver 8 and redirected through the entry point 14 to the sub-application 15 that was placed in the printer mini-driver's Control function. The GDI function call is decoded 27 and the match of the command type to Next Band causes program execution to be routed through the path labeled Action 2 25. Upon entry into Action 2 25, Valid 38 is tested 40. If Valid 38 is FALSE (no valid image exists) no further execution in Action 2 25 is performed and control is returned to the printer mini-driver 8 through 16. If Valid 38 is TRUE a row of pixels corresponding to the PageCnt 39 row offset (R1–R32) in the bit map image 41, now stored in memory as a stored image 30, will be prepared for being overlaid into the printer device context in function EdgePrintBitmap 34.

The image position origin is calculated based on page size, page orientation and the image size. Then the overlay bit map is copied directly into the device context using the UNIDRV.DLL function call GlBitBlt 37 through 28, and the variable PageCnt 39 is incremented by 1 35. Control returns to the printer mini-driver 8 through 16. This step is repeated once for every page, each page receiving a raster line of data that corresponds to its respective page in the document.

It should be noted that each DIB bit map image 41 may have a small white margin above and below the text. This serves to pad the page count out to an even multiple of 32 as required by the standard BMP file format. It also helps center the image within the total document. This white space will be printed as white pixels, that is to say nothing will be printed.

When the application has completed writing the image for the entire document into the device context it issues a GDI Control function call 7 with End Document as the specific command type. This GDI call is received by the printer mini-driver 8 and is redirected through the entry point 14 to the sub-application 15 that was placed in the printer mini-driver's Control function. The GDI function call is decoded 27 and the match of the command type to End Document causes program execution to be routed through the path labeled Action 3 26. Upon entry into Action 3 26 a general cleanup and shutdown of the sub-application is performed 36. Then control is returned to the printer mini-driver 8 through 16.

Figure 8A:
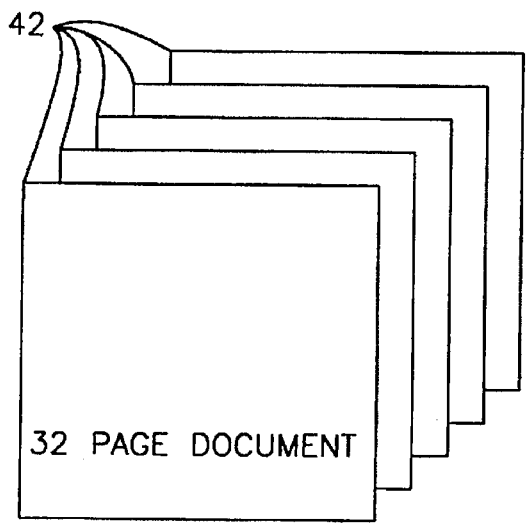
FIG. 8A is an exploded plan view of a 32 page document without the addition edge printed text.
Figure 8B:
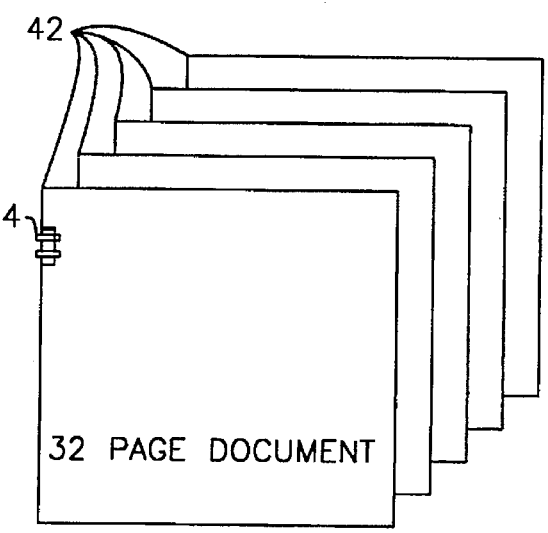
FIG. 8B is an exploded plan view of a 32 page document including edge printed text inserted by the present invention.
Figure 8C:
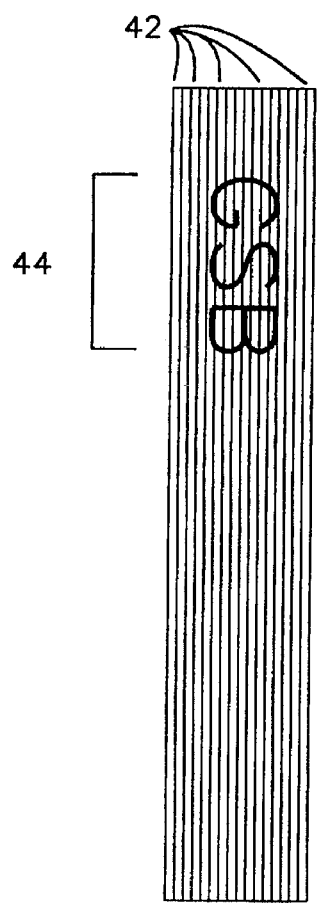
FIG. 8C is an assembled side view of a 32 page document including edge printed text inserted by the present invention.

FIG. 8A depicts an exploded view of the 32 page source document after it has been printed without the addition of any edge printed text. FIGS. 8B and 8C depict the same 32 page source document after it has been printed utilizing the preferred embodiment of the present invention. As illustrated in the figures, each sheet of the printed document 42 has been supplemented by the addition of a raster line 44 of the overlaid bit map image 41. As a result, when the complete document is properly collated and assembled the bit map image 41 which was created using Edgetool 45 may be seen when viewing the side of the document.

In the above example the text to be edge printed was input utilizing a program external to the sub-application (i.e., Edgetool 45). This function can alternatively be performed within the sub-application itself by modifying Action 1 24. In such an embodiment, rather than opening the DIB file 32 and reading the DIB image 33 into memory as a stored image 30, Action 1 24 would instead perform the tasks performed by Edgetool 45. Specifically, text to be edge printed and the page count would be input and the image rasterized and scaled according to the requirements of the target document. This would eliminate the need for the intermediate BMP file (EDGE64.BMP) and the image could be loaded directly into memory as a stored image 30.

Figure 9A:
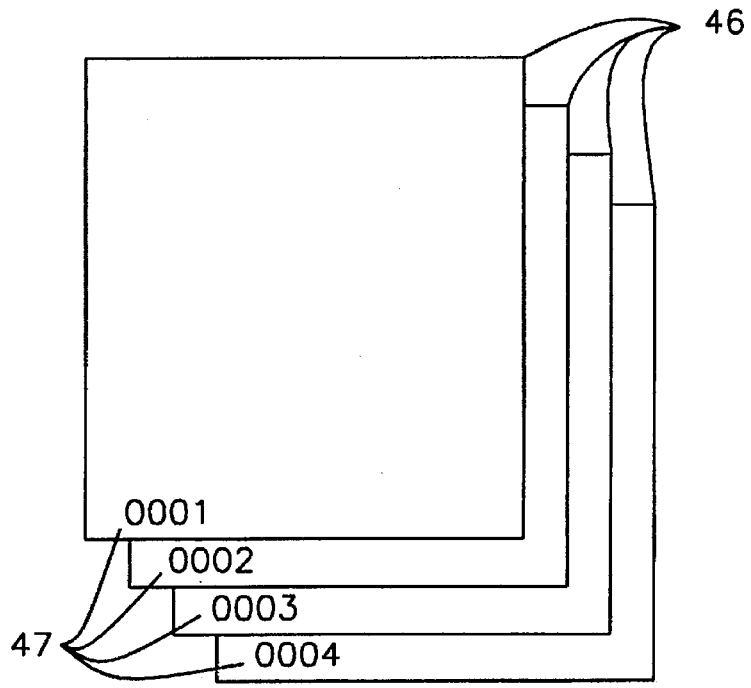
FIG. 9A is an exploded plan view of a 4 page document including annotation text added by the present invention.

In an alternative embodiment of the present invention, an annotation sub-application would allow the user to place a text line anywhere on the document (preferably at the top or bottom edge). The text line would contain a number field that could be programmed to increment or decrement for each document page. In addition, a text field and even a time and date field may also be included. FIG. 9A depicts a four page document 46 which has annotation text 47 added thereon by such a sub-application.

Figure 9B:
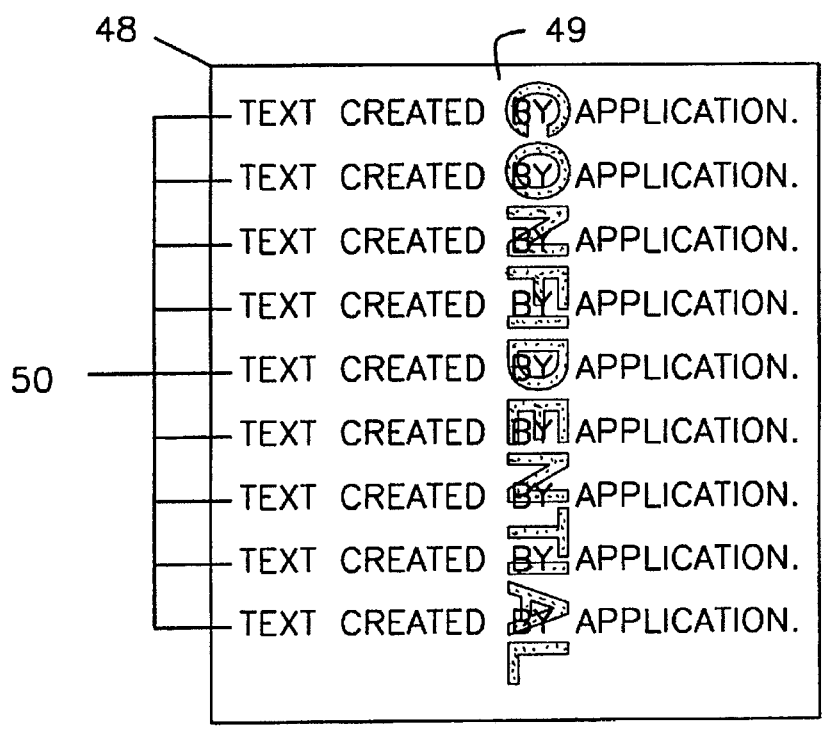
FIG. 9B is plan view of a 1 page document including overstrike text added by the present invention.

In another embodiment, an overstrike sub-application would allow a user to overlay very large textual words such as "CONFIDENTIAL" or "COPY" across the surface of a page using a lighter tone brush or a different color as not to obliterate the underlying image. FIG. 9B illustrates a single page document 48 which has overstrike text 49 added to text 50 which was produced by a main application such as a word processor. It is important to note that although the overstrike text 49 is printed over the main text 50, the main text 50 is still legible due to the relatively darker contrast of the main text 50.

Other variations of the present invention might include the automatic production of custom forms or letterhead. These applications all use the same print modification techniques to accomplish its end result as that described above in the context of the Edge Print program.

Although the above examples relate to adding text to a document, either on its surface or edge printed, the methods described herein are equally applicable to adding graphic images or a combination of graphics and text. To create an overlay image comprised of graphics and/or text, a program similar to Edgetool 45 could easily be developed to input graphics in addition to text, or an existing program such as Microsoft Windows Paintbrush could be used. One use for incorporating graphic images into a document is the addition of a watermark to a document or the incorporation of a graphic image into a document which was created by a word processor incapable of producing graphics.

As illustrated by the above examples, the overlay image added to a document need not be input from the user. It may be entirely computer generated or a combination of user input and computer generated. For example, in the annotation embodiment described above, a user may wish to annotate each page with the document title, the date and the page number. The document title would be input from the user and the date would be read from the internal clock and calendar of the computer. The page number would be recorded as a variable and automatically incremented by the sub-application of the present invention.

It should be apparent that variations of the specific embodiment will make themselves obvious to those of ordinary skill in the art and are intended to fall within the spirit and scope of the present invention. All patents and publications referred to herein are incorporated by reference.

We claim:

1. In a computer system having an application for creating a source document and a printer driver for creating a document image from said source document and delivering said document image to a printing means, a method for incorporating user unaided readable indicia into said document image prior to delivery to said printing means without modifying said source document, said method comprising the steps of:
   (a) interrupting execution of said printer driver in response to an added command in said printer driver which redirects program execution into a sub-application;
   (b) adding said user unaided readable indicia to said document image prior to delivery of said document image to said printing means, wherein in response to a set of escape function commands which are redirected by said added command, said sub-application inserts data representing at least part of said user unaided readable indicia, from a device independent file into a device context block of computer memory having at least one page of said document image from said application therein; and
   (c) redirecting program flow back to said printer driver.

2. The method of claim 1 wherein the interruption of execution of said printer driver in step (a) is performed after each page of said source document is sent to said printer driver for creation of said document image.

3. The method of claim 1 wherein the interruption of execution of said printer driver in step (a) is performed before each page of said source document is sent to said printer driver for creation of said document image.

4. The method of claim 1 wherein the user unaided readable indicia added to said document image in step (b) comprises successive raster lines of a bit map image to be edge printed.

5. The method of claim 1 wherein the user unaided readable indicia added to said document image in step (b) comprises a user unaided readable overlay image to the document image.

6. The method of claim 5 wherein said user unaided readable overlay image is to be printed across the document image without obliterating the document image.

7. The method of claim 5 wherein said user unaided readable overlay image comprises a text line of less intensity than the document image.

8. In a computer system having an application for creating a source document and a printer driver for creating a document image from said source document and delivering said document image to a printing means, an improvement for enabling said computer system to incorporate user unaided readable indicia into said document image prior to delivery to said printing means without modifying said source document, said improvement comprising:
   (a) means for interrupting execution of said printer driver in response to an added command in said printer driver which redirects program execution into a sub-application;
   (b) means for adding said user unaided readable indicia to said document image prior to delivery of said document image to said printing means, wherein, in response to a set of escape function commands which are redirected by said added command, said sub-application inserts data, representing at least part of said user unaided readable indicia, from a device independent file into a device context block of computer memory having at least one page of said document image from said application therein; and
   (c) means for redirecting program flow back to said printer driver.

9. The computer system of claim 8 wherein the means for interrupting execution of said printer driver includes means for interrupting execution of said printer driver after each page of said source document is sent to said printer driver for creation of said document image.

10. The computer system of claim 8 wherein the means for interrupting execution of said printer driver includes means for interrupting execution of said printer driver before each page of said source document is sent to said printer driver for creation of said document image.

11. The computer system of claim 8 further comprising means for generating a bit map image to be edge printed.

12. The computer system of claim 11 further comprising means for inputing a bit map image to be edge printed.

13. The computer system of claim 8 wherein the means for adding said user unaided readable indicia to said document image includes means for generating a user unaided readable overlay image to the document image.

14. The computer system of claim 13 wherein said user unaided readable overlay image is printed across said document image without obliterating the document image.

* * * * *